UNITED STATES PATENT OFFICE.

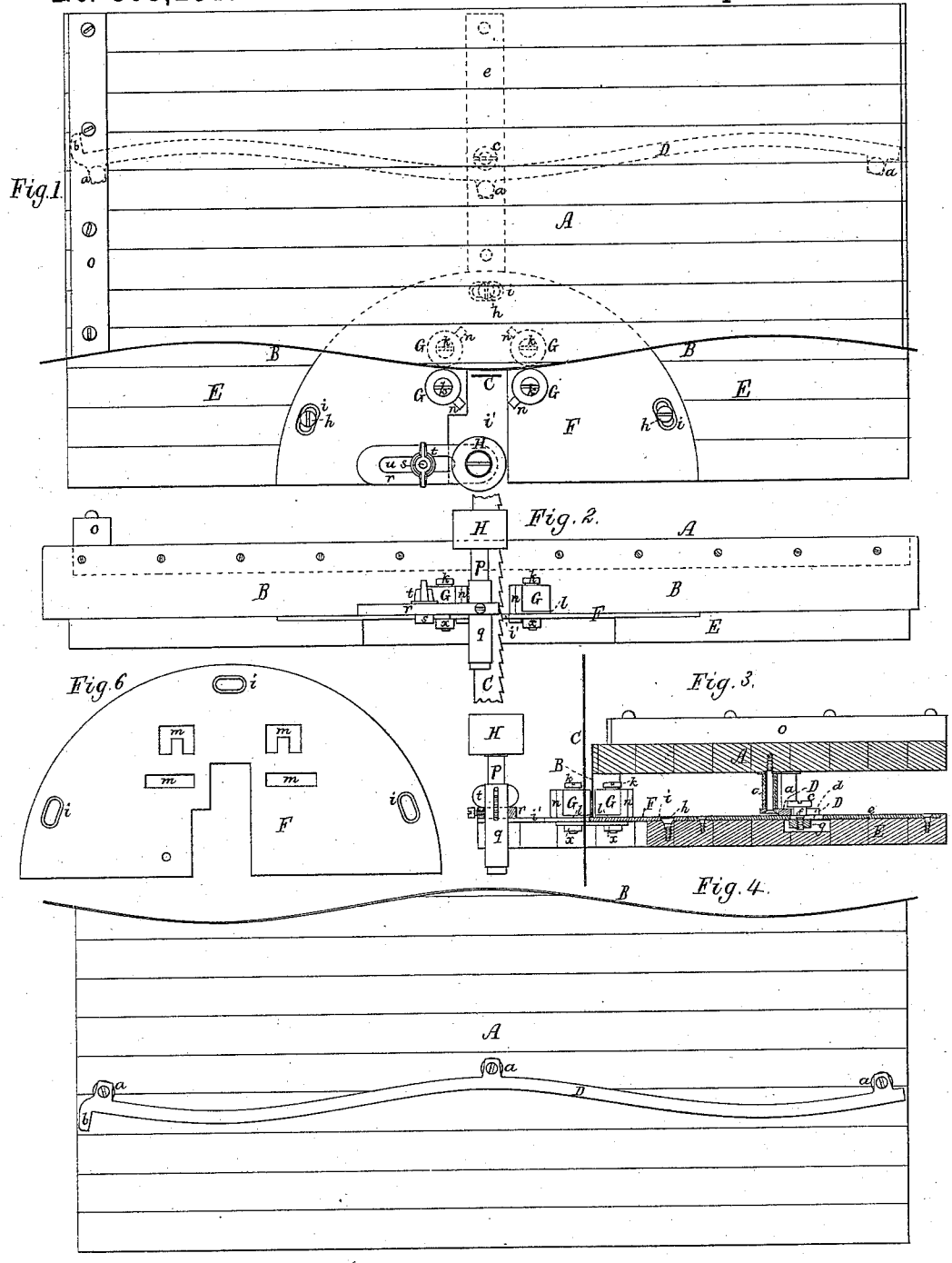

JOSEPH CHENEY, OF ATHOL, MASSACHUSETTS.

SAW-TABLE GAGE.

SPECIFICATION forming part of Letters Patent No. 305,291, dated September 16, 1884.

Application filed June 30, 1884. (No model.)

*To all whom it may concern:*

Be it known that I, JOSEPH CHENEY, of Athol, in the county of Worcester, of the Commonwealth of Massachusetts, have invented a new and useful Improvement in Machinery for Curvilinear Sawing; and I do hereby declare the same to be described in the following specification and represented in the accompanying drawings, of which—

Figure 1 is a top view, Fig. 2 a front elevation, and Fig. 3 a transverse section, of a machine provided with my invention, the nature of which is defined in the claims hereinafter presented. Fig. 4 is an under side view of the movable table. Fig. 5 is a vertical section of one of the guide-rollers and its semicircular support-plate. Fig. 6 is a side view of such support-plate without any of the parts attached thereto. Fig. 7 is a vertical section of the adjustable gage-roller and its spindle, the supporting-spring thereof, and the devices for sustaining the spring.

In the said drawings, A denotes a movable table, upon which is to be placed the board or piece of stuff to be sawed curvilinearly, there being fixed to one edge of such table, and projecting downward therefrom, a guide or thin plate, B, of metal, curved lengthwise in the form of the kerf. The saw shown at C is to cut in the board or stuff. There is also fixed in three posts or standards, $a$, extending down from the bottom of the table A, a rail, D, having at one end a hook or abutment, $b$. The outer edge of this rail is curved in parallelism with the guide B, and extends underneath the head and against the shank of an adjustable screw-bolt, $c$. The said shank goes down through a slot, $d$, in a plate, $e$, fixed in the bed E, over which the table is arranged, as shown. The shank has a shoulder, $f$, to rest on the plate $e$, and such shank screws into a nut, $g$, arranged underneath the plate $e$. The head of the bolt $c$ is nicked to receive the end of the blade of a screw-driver. The slot $d$ ranges transversely of the machine. Turning back the screw-bolt will lessen its hold upon the plate, so as to admit of such bolt being adjusted nearer to or farther from the saw. Turning forward the screw-bolt will screw it into the nut and draw the latter up to and the shoulder of the bolt down upon such plate, in order to clamp the bolt in position. The bolt with the rail D serve as auxiliary means of guiding the table in its curvilinear movement longitudinally of it. The hook or abutment $b$, by bringing up against the bolt when the table may be moved backward, answers to arrest the motion of the table after the saw may have performed its office in completing a kerf. There is let into the bed E, flush with its upper surface, a semicircular plate, F, which is fastened to the bed by three screws, $h$, going through three curved slots, $i$, in the plate, the whole being so as to enable the plate to be turned or adjusted a little concentrically of it relatively to the saw, so as to bring the guide-rollers of the bed into proper positions thereto. These guide-rollers are represented at G, there being two pairs of them, one of which is in advance and the other in rear of the saw, which is generally what is termed an "endless band" or "belt" saw, it being arranged within an opening, $i'$, in the middle of the plate. Each guide-roller G revolves freely on the shank of a vertical pivotal screw, $k$, that extends down through a disk, $l$, and is provided with a shoulder to rest thereon. The said shank also goes down through a slot, $m$, in the plate F. A nut, $x$, screwed on the said shank and against the said plate, serves to confine both the screw and the disk in position. From each disk there projects upward close to the periphery of each roller a scraper, $n$, for removing from such periphery while the roller may be revolving any sawdust that may get or drop thereon.

The guide B extends directly between the rollers G of each pair of them, and when the table, with the stuff to be sawed, is moved endwise such rollers and guide produce lateral movements of the table, such as will cause the saw to cut in the stuff a curvilinear kerf in parallelism with the guide. The board or stuff, while being sawed, rests against an abutment or ledge, $o$, extending upward from the table at one end thereof. The thickness of each curvilinear strip to be taken from the board is determined by a gage-roller, H, which, arranged, as shown, aside of the saw, revolves on an upright spindle, $p$, supported so as to slide vertically in a tubular standard, $q$. The latter is sustained by an adjustable arm, $r$, that rests on the plate F, and is held thereto by a screw, s, and nut t, the said screw extending upward through the plate and a slot, u, arranged lengthwise in the arm. Within the standard q, and resting on the bottom of the socket thereof, is a spiral spring, u', for the spindle p to rest on. This spring is to enable the roller to move downward in case of a board being laid upon it preparatory to and while the first saw-kerf may be in the act of being made through the board, it often being necessary to remove from the board at the start a piece wider than the second piece to be taken from it, in which case the board would not at its edge bear against the periphery of the roller, but would generally project over the roller, which, in order not to be in the way of the board, is movable downward when the board is laid upon it.

Instead of the rollers G, as described, I sometimes employ two cylindrical posts, grooved diametrically to receive the guide-plate B, and adapted to the plate F, so as to be revoluble or be capable of turning thereon, as may be required, to enable the guide-plate to pass lengthwise through such grooves. These slotted and revoluble posts may be adapted to the plate, so as to be adjustable on it properly relatively to the saw, to cause the plate B to be at its necessary distance therefrom.

In using the machine the stuff or board to be sawed up into curvilinear strips is laid on the table, the rear end of the board being against the abutment or ledge o. The table is next moved endwise, so as to force the board at its front end against the saw, which, being supposed to be in motion, will cut through the board in a curvilinear path or kerf as the table is moved along. This having been done, the table is to be retracted and the board moved on laterally, so as to carry its curved edge against the periphery of the gage-roller H. The table is next to be advanced, so as to cause the saw to again cut a kerf parallel to the first one or edge of the board. By continuing this operation the board may be reduced to curved strips alike in size.

I do not claim, in saw-table gages for curved work, the combination of a table, fixed spools, feed-pattern guide-tracks, and movable rolls, arranged and applied as shown in the United States Patent No. 273,000. Nor do I claim an apparatus for sawing segment-blocks upon a scroll-sawing machine consisting of the combination of a carrier-block, which holds that end of the block from which the segment is to be cut at one of its sides, and is there provided with gages, and at the opposite side with adjustable guiding devices, with an arc guide secured to a saw-table and to guide the carrier-block so as to feed the blank to the saw on a curve all being as shown in the United States Patent No. 275,807.

I claim—

1. The combination of the movable table A and the curvilinear guide B, fixed to and extending below the front edge of such table, with the bed E and its two pairs of guide-rollers, G, pivoted to its upper side, and having the said guide projecting between the rollers of each pair, all being substantially as set forth.

2. The combination of the movable table A, the curvilinear guide B, affixed to and projecting below the front edge of such table, and the rail D, having at one end the stopping abutment or hook b, and fixed to posts extending down from the bottom of the table, with the bed E, its two pairs of guide-rollers, G, and the adjustable screw-bolt c, the rollers being pivoted to the bed, and the said guide being projected between the rollers of each of the said pairs, and the said bolt having the rail bearing against its shank and extending under its head, all substantially as set forth.

3. The combination of the adjustable semicircular plate F, arranged within the bed, and slotted as described, and held to the said bed by screws h going through the slots i, with the two pairs of guide-rollers G, supported by the said plate, and screw-bolts or pivots k, extending upward therefrom, and with the table A, arranged over the bed and provided with the curvilinear guide B, extending between the rollers of each pair, all being substantially and to operate with a saw as set forth.

4. The combination of the stationary scrapers n, extending upward from the bed E against the peripheries of the two pairs of its guide-rollers G, with the said rollers pivoted to the said bed, and with the movable table A, provided with the curvilinear guide B, extending down therefrom, and between the rollers of each of said pairs, all being substantially as represented.

5. The combination of the gage roller H and its spindle p, tubular standard q, spring u', adjustable slotted arm r, and the screw and nut for connecting the said arm to the plate F, with the bed E and the two pairs of guide-rollers G, and with the movable table A, provided with the curvilinear guide B, extending between the rollers of the said two pairs, all being substantially and to operate as set forth.

JOSEPH CHENEY.

Witnesses:
ASA HAVEN GODDARD,
ENOCH T. LEWIS.